US008676759B1

(12) United States Patent
Zhu et al.

(10) Patent No.: US 8,676,759 B1
(45) Date of Patent: Mar. 18, 2014

(54) CONTINUOUS DATA BACKUP USING REAL TIME DELTA STORAGE

(75) Inventors: Shunhui Zhu, San Jose, CA (US); Boris Yanovsky, Saratoga, CA (US); William Dunn, Cupertino, CA (US); Matthew W. Cotton, Santa Clara, CA (US)

(73) Assignee: SonicWALL, Inc., San Jose, CA (US)

( * ) Notice: Subject to any disclaimer, the term of this patent is extended or adjusted under 35 U.S.C. 154(b) by 286 days.

(21) Appl. No.: 12/571,250

(22) Filed: Sep. 30, 2009

(51) Int. Cl.
*G06F 17/00* (2006.01)
(52) U.S. Cl.
USPC .......................................... 707/638; 707/640
(58) Field of Classification Search
USPC ................... 707/638–647, 674–681
See application file for complete search history.

(56) References Cited

U.S. PATENT DOCUMENTS

| 7,720,892 | B1 * | 5/2010 | Healey et al. | 707/831 |
| 2005/0071640 | A1 * | 3/2005 | Sprunk et al. | 713/176 |
| 2007/0100913 | A1 * | 5/2007 | Sumner et al. | 707/204 |
| 2007/0281664 | A1 * | 12/2007 | Kaneko et al. | 455/410 |
| 2008/0134337 | A1 * | 6/2008 | Crescenzo et al. | 726/24 |
| 2009/0180698 | A1 * | 7/2009 | Ramani et al. | 382/219 |

OTHER PUBLICATIONS

Konkle, Joshua L., "Microsoft Volume Shadow Copy Service (VSS) for Continuous Data Protection (Part 1)", accessed at: http://inmage.dciginc.com/2008/01/microsoft-vss-inmage-pt1.html on Sep. 3, 2009, last updated May 21, 2009, 3 pages.
Konkle, Joshua L., "Microsoft Volume Shadow Copy Service (VSS) for Continuous Data Protection (Part 2)", accessed at: http://inmage.dciginc.com/2008/02/microsoft-vss-inmage-pt2.html on Sep. 3, 2009, last updated Feb. 4, 2008, 3 pages.
"Rsync", accessed at: http://www.samba.org/rsync/ on Sep. 3, 2009, 5 pages.
"Rsync features", accessed at: http://www.samba.org/rsync/features.html on Sep. 3, 2009, 1 page.
"Rsync examples", accessed at: http://www.samba.org/rsync/examples.html on Sep. 3, 2009, 3 pages.
"How Rsync Works: A Practical Overview", accessed at: http://www.samba.org/rsync/how-rsync-works.html on Sep. 3, 2009, 5 pages.
"The Rsync Algorithm", accessed at: http://rsync.samba.org/tech_report/ on Sep. 3, 2009, 1 page.
"The Problem", accessed at: http://rsync.samba.org/tech_report/node1.html on Sep. 3, 2009, 1 page.
"The Rsync Algrithm", accessed at: http://rsync.samba.org/tech_report/node2.html on Sep. 3, 2009, 1 page.
"Rolling Checksum", accessed at: http://rsync.samba.org/tech_report/node3.html on Sep. 3, 2009, 2 pages.

(Continued)

*Primary Examiner* — Wilson Lee
(74) *Attorney, Agent, or Firm* — Lewis Roca Rothgerber LLP

(57) ABSTRACT

A continuous data backup using real time delta storage has been presented. A backup appliance receives a backup request from a backup agent running on a computing machine to back up data on the computing machine. The computing machine is communicatively coupled to the backup appliance. Then the backup appliance performs block-based real-time backup of the data on the computing machine. The backup appliance stores backup data of the computing machine in a computer-readable storage device in the backup appliance.

40 Claims, 8 Drawing Sheets

(56) References Cited

OTHER PUBLICATIONS

"Checksum Searching", accessed at: http://rsync.samba.org/tech_report/node4.html on Sep. 3, 2009, 1 page.
"Pipelining", accessed at: http://rsync.samba.org/tech_report/node5.html on Sep. 3, 2009, 1 page.
"Results", accessed at: http://rsync.samba.org/tech_report/node6.html on Sep. 3, 2009, 3 pages.
"Availability", accessed at: http://rsync.samba.org/tech_report/node7.html on Sep. 3, 2009, 1 page.
"About this Document . . . ", accessed at: http://rsync.samba.org/tech_report/node8.html on Sep. 3, 2009, 1 page.
Tridgell, Andrew, "Efficient Algorithms for Sorting and Synchronization", doctoral thesis, Australian National University, Canberra, Australia, Feb. 1999, 115 pages.

\* cited by examiner

CONTINUOUS DATA BACKUP USING REAL TIME DELTA STORAGE

TECHNICAL FIELD

The present invention relates to data backup in a networked system, and more particularly, to providing continuous data backup.

BACKGROUND

Conventionally, many data backup mechanisms have been developed to meet the need of networked systems of different sizes and configurations. These conventional data backup mechanisms range from manual implementation to fully automated designs. However, one common characteristic between many conventional data backup mechanisms is the shutdown of a machine in which data is being backed up. In general, downtime of the networked system is scheduled in advance, typically periodically (such as monthly, weekly, nightly, etc.), such that data in the networked system can remain stable during the downtime to allow copying of the data to backup storage. It is important for these conventional backup mechanisms that the data remains stable during the backup in order to preserve consistency in the data.

One disadvantage of the above conventional mechanisms is the requirement of shutting down the networked system. Even though the data in the networked system changes in between the scheduled downtimes, these changes may not be captured and backed up because it is impractical, if not infeasible, to shutdown the networked system whenever the data in the networked system changes.

BRIEF DESCRIPTION OF THE DRAWINGS

The present invention is illustrated by way of example, and not by way of limitation, in the figures of the accompanying drawings and in which.

DETAILED DESCRIPTION

Figure 1:
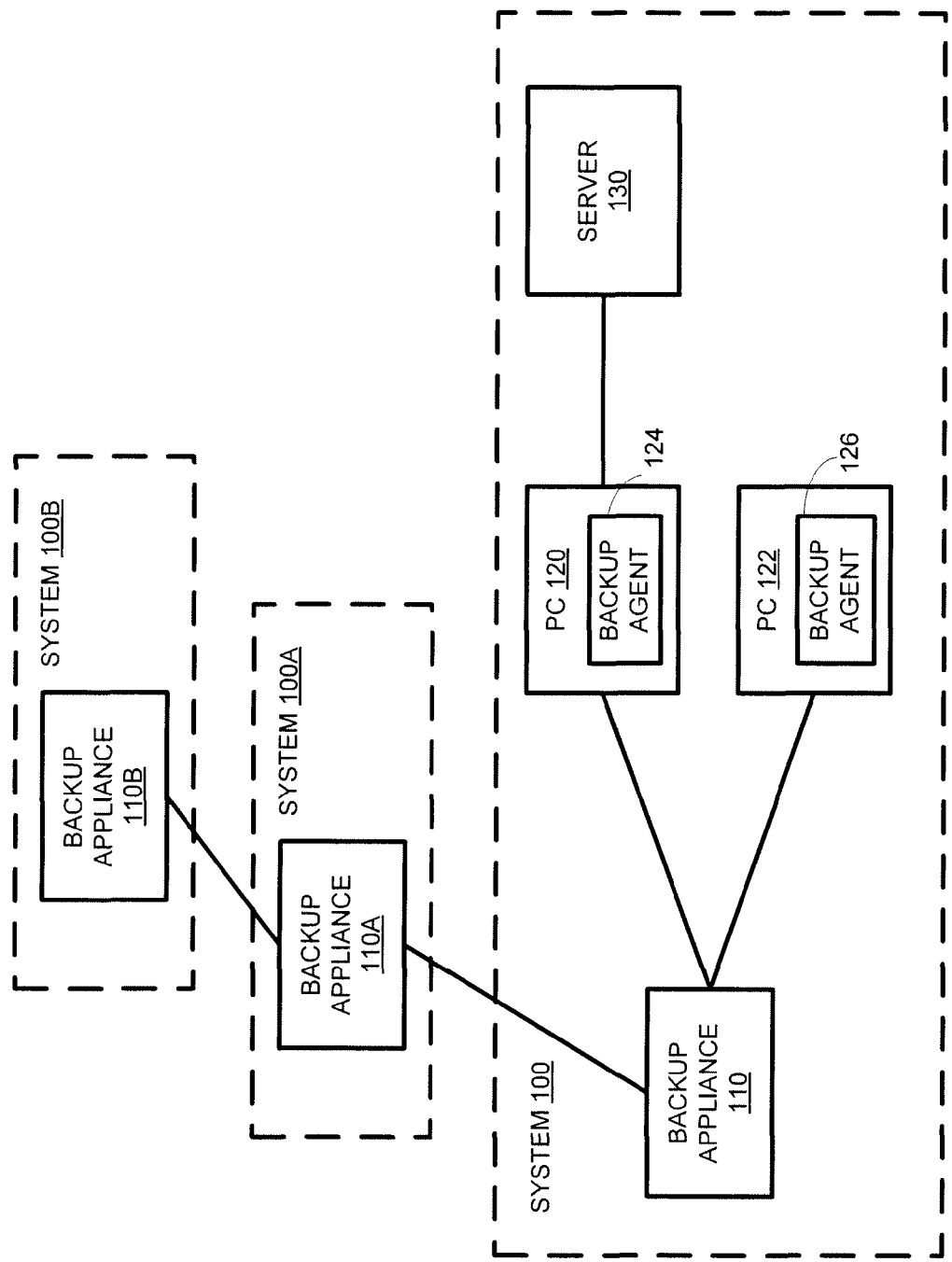
FIG. 1 illustrates one embodiment of a system.

Described herein are some embodiments of continuous data backup using real time delta storage. In one embodiment, a backup appliance receives a backup request from a backup agent running on a computing machine to back up data on the computing machine. The computing machine is communicatively coupled to the backup appliance. Then the backup appliance performs block-based real-time backup of the data on the computing machine. The backup appliance stores backup data of the computing machine in a computer-readable storage device in the backup appliance. Details of some embodiments of continuous data backup using real time delta storage and some embodiments of an associated method to restore data are further discussed below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "backing up" or "computing" or "restoring" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a networked system. The networked system 100 includes a backup appliance 110, two personal computers (PCs) 120 and 122, and a server 130. Both PCs 120 and 122 are coupled to the backup appliance 110. Each of the PCs 120 and 122 has a backup agent running on it. Each of the PCs 120 and 122 may or may not be further coupled to other devices or machines (e.g., servers, firewalls, database, etc.). For example, PC 120 is further coupled to server 130, while PC 122 is not further coupled to any other devices or machines. Note that PCs 120 and 122 are merely examples of computing machines on which the backup agents 124 and 126, respectively, may run on. The backup agents 124 and 126 may run on other types of computing machines, such as servers, laptop computers, personal digital assistants (PDAs), smart phones, etc. Furthermore, the backup appliance 110 may be coupled to computing machines in addition to the PCs 120 and 122 to backup data on the additional computing machines as well. Alternatively, the backup appliance 110 may be coupled to only a single computing machine to backup data on the single computing machine. In some embodiments, the backup appliance 110 may be further coupled to one or more other backup appliances (e.g., backup appliance 110a) to form a chain. Alternatively, the backup appliance may be further coupled to an offsite or remote storage device. Details of some embodiments of the backup appliance 110 and the backup agents 124 and 126 are discussed below with reference to FIGS. 2 and 3, respectively.

In general, the backup appliance 110 backs up data of a computing machine (such as PC 120) in operation with a backup agent running on the computing machine (such as backup agent 124). Instead of backing up data in files, which is the typical unit of data stored on the computing machine, the backup appliance 110 backs up data in smaller units, such as blocks. In some embodiments, the blocks are of a fixed size. Initially, the backup agent, such as backup agent 124, divides a data file into blocks and sends the blocks to the backup appliance 110 to be backed up. Furthermore, the backup agent may capture changes in the data file in real time and back up the blocks affected by the changes in the backup appliance 110. Details of some embodiments of a method to backup a data file initially and to backup updates to the data file subsequently are discussed below with reference to FIGS. 4A-4B and 5A-5B. Note that in addition to the above real time block-based continuous data backup, the backup appliance 110 and the backup agent may apply other backup techniques to backup the data on the computing machine, such as Volume Shadow Copy Service (VSS) on Microsoft Windows platform. One embodiment of a method to apply both real time blocked-based continuous data backup and VSS to backup data on a computing machine is discussed below with reference to FIG. 6.

In some embodiments, the backup appliance 110 and the backup agent may restore a prior version of the data file in response to a user request. The backup appliance 110 may send the appropriate blocks to the backup agent, which may assemble the blocks received on the computing machine back into the requested version of the data file. Details of some embodiments of a method to restore data are discussed below with reference to FIGS. 4C and 5C.

In some embodiments, the backup appliance 110 also provides built-in security. Because the backup appliance 110 backs up data from both computing machines 120 and 122, the backup appliance 110 and/or the backup agents 124 and 126 may implement certain security procedures to prevent one computing machine from accessing the backup data of the other computing machine. For instance, the backup agents 124 and 126 may encrypt their respective backup data before sending it to the backup appliance 110 such that even the administrator of the backup appliance 110 cannot view the backup data. In another embodiment, the backup appliance 110 may encrypt backup data from computing machine 120 before storing the backup data such that computing machine 122 cannot decrypt the backup data from computing machine 120. Alternatively, the backup appliance 110 may request a password previously provided by computing machine 120 from a computing machine before allowing the computing machine to access the backup data of computing machine 120. In some embodiments, the backup appliance 110 and/or the backup agents 124 and 126 may further compress the backup data before storing or sending the backup data in order to save storage space on the backup appliance 110. In one embodiment where the backup agents 124 and 126 compress the backup data before sending it to the backup appliance 110, network traffic can be reduced as well as storage needed on the backup appliance 110.

The above block-based real time continuous data backup approach allows data to be backed up substantially continuously without interrupting or suspending other operations or applications running on the computing machines 120 and 122. Unlike some conventional backup schemes, there is no need to schedule data backups at specific times and shut down the computing machines 120 and 122 at the specific times in order to backup data consistently using the above backup technique. Also, the above backup technique does not require substantial effort from the administrator of the system 100 or the users of the computing machines 120 and 122. The backup agents 124 and 126 automatically capture changes of data in real time and back up the changes automatically. Thus, the above backup technique provides user-friendly and low maintenance data backup to the system 100.

In some embodiments, the backup appliance 110 is further coupled to one or more other backup agents in other systems to form a backup chain to offer more data protection. For instance, referring to FIG. 1, backup appliance 110 is further coupled to backup appliance 110a in system 100a, which is further coupled to backup appliance 110b in system 100b. System 100 can be viewed as a downstream box, in which the backup appliance 100 may monitor changes to data within (which originate from changes detected by backup agents 124 and/or 126). In response to changes to data in system 100, the backup appliance 100 may further backup the changes to the data using backup appliance 100a in system 100a, which may further backup the changes to the data using backup appliance 100b in system 100b. Thus, the changes may propagate upstream from backup appliance 110 to backup appliance 110a, and then to backup appliance 110b, to give more protection of data. Note that each of the backup appliances 110, 110a, and 110b may add its own encryption, forming a data security chain.

Figure 2:
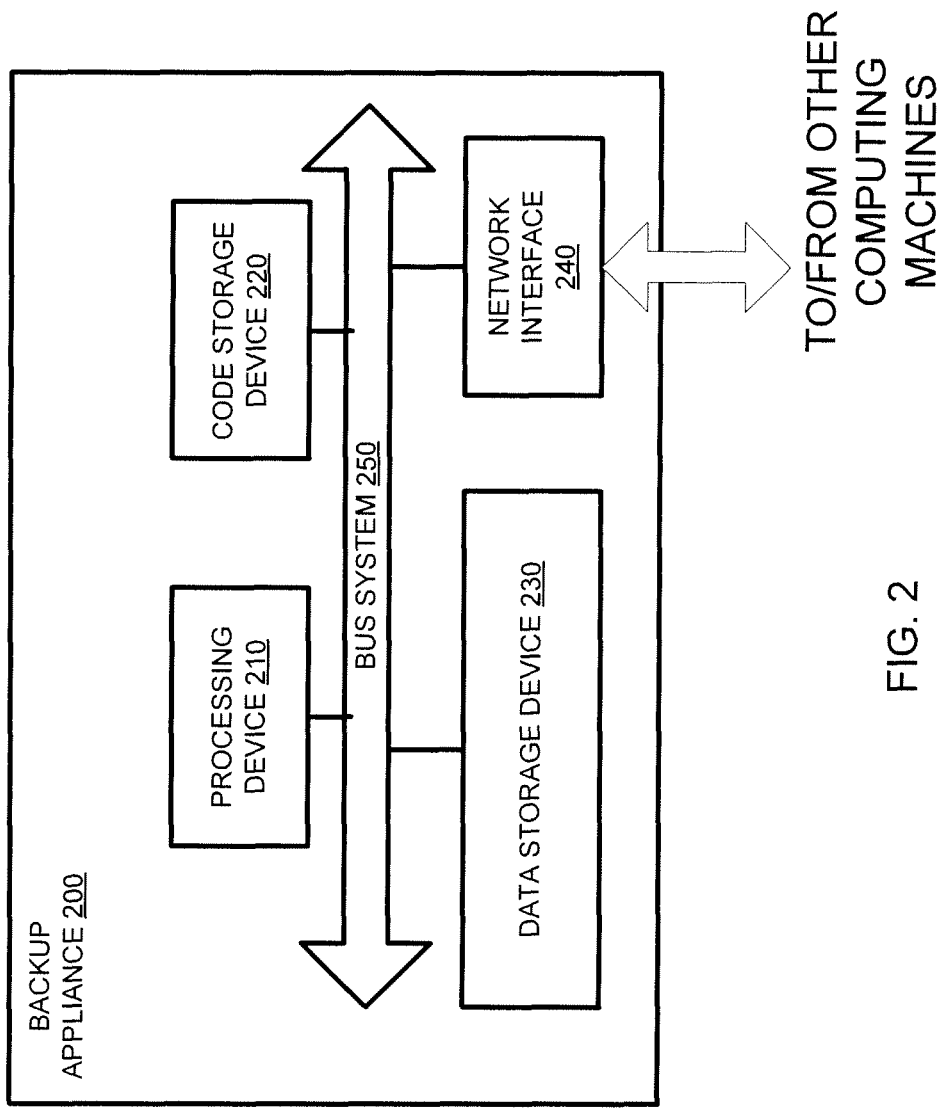
FIG. 2 illustrates one embodiment of a backup appliance.

FIG. 2 illustrates one embodiment of a backup appliance, such as the backup appliance 110 illustrated in FIG. 1. The backup appliance 200 may be implemented with a special-purpose set-top box, a general-purpose computing machine, etc. The backup appliance 200 includes a processing device 210, a code storage device 220, a data storage device 230, and a network interface 240, coupled to each other via a bus system 250. The processing device 210 may include a general-purpose microprocessor or a special-purpose processor. The code storage device 220 and the data storage device 230 may be implemented with one or more types of computer-readable storage media, such as ROMs, RAMs, EPROMs, EEPROMs, flash memory, magnetic or optical cards, etc. Although the code storage device 220 and the data storage device 230 are illustrated to be two separate components in the backup appliance 200, they may or may not be implemented on the same computer-readable storage medium in some embodiments. Instructions executable by the processing device 210 may be stored in the code storage device 220. By retrieving and executing the instructions from the code storage device 220, the processing device 210 may backup and/or restore data of a computing machine coupled to the backup appliance 200. The processing device 210 may store data backed up in the data storage device 240. The network interface 240 may include a network card to connect to a network, such as local area network (LAN), to allow the backup appliance 200 to communicate with other machines and/or devices via the network. The bus system 250 may include one or more buses internal to the backup appliance 200 to allow various components in the backup appliance 200 to communicate with each other.

In some embodiments, the network interface 240 receives a request from a backup agent running on a computing machine (e.g., the backup agent 124 running on PC 120 in FIG. 1). The request may be a backup request to backup a data file, a backup request to backup updates to a data file, or a restore request. As used herein, a data file (or simply referred to as a file) broadly refers to a file containing data, such as a word processing file, a spreadsheet, a bitmap file, etc. If the request is a backup request to backup a data file, the network interface 240 may further receive blocks of the data file from the backup agent, and the processing device 210 may store the blocks received in the data storage device 230. If the request is a backup request to backup changes to a data file, the network interface 240 may receive blocks affected by the changes and the processing device 210 may backup these blocks only along with other blocks of the data file previously backed up. If the request is a restore request to restore a particular version of a data file, the processing device 210 may determine which backed up blocks of the data file are needed to re-create or re-build the particular version requested, retrieve these blocks from the data storage device 230, and send these blocks via the network interface 240 to the requesting backup agent to be re-assembled into the particular version of data file. Details of some embodiments of the operations of the backup appliance 200 are discussed below with reference to FIGS. 4A-4C.

Figure 3:
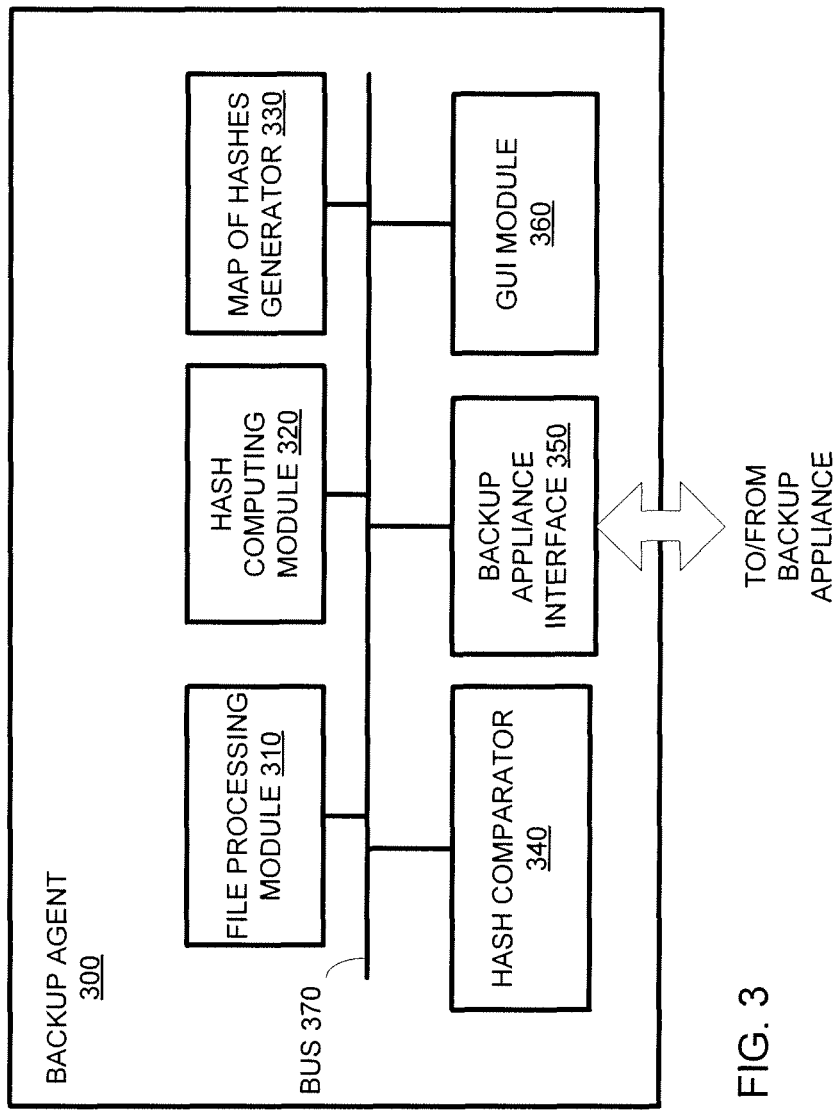
FIG. 3 illustrates one embodiment of a backup agent.

FIG. 3 illustrates one embodiment of a backup agent executable on a computing machine, such as a personal computer, a server, a PDA, a smart phone, etc. The backup agent 300 includes a file processing module 310, a hash computing module 320, a map of hashes generator 330, a hash comparator 340, a backup appliance interface 350, and a graphical user interface (GUI) module 360, coupled to each other via a bus 370. These components of backup agent 300 may be implemented using hardware (e.g., field programmable logic arrays, comparators, or other special-purpose circuitry), or software executable on hardware (e.g., programming code executable on a general-purpose processor).

To backup a data file, the file processing module 310 initially divides the data file into a number of blocks in some embodiments. The blocks may be of the same size. Then the hash computing module 320 computes hashes of the blocks, and the map of hashes generator 330 generates a map of hashes for the data file. The map of hashes can be used to re-assemble the blocks into the data file. The backup appliance interface 350 then sends the blocks, the hashes of the blocks, and the map of hashes to the backup appliance to be stored thereon. The blocks, the hashes of the blocks, and the map of hashes may be collectively referred to as the backup data of the data file. In some embodiments, the hash computing module 320 computes two or more hashes for each block in order to avoid hash collision. The hash computing module 320 may use different hash algorithms to compute the two or more hashes, such as Message-Digest algorithm 5 (MD5), Cyclic Redundancy Check (CRC), etc.

After the above initial backup of the data file, the file processing module 310 may receive notifications of changes to the data file from a file system running on the computing machine. The changes may be due to editing of the data file, deletion of the file, etc. In response to a notification, the hash computing module 320 may compute a second set of hashes for the blocks of the current version of the data file. In addition, the backup agent 300 may request a previous version of the hashes from the backup appliance, against which comparison is done. If the hashes of a block have not changed, then the block is not affected by the change in the data file. On the other hand, if the hashes of a block have changed, then the block is affected by the change in the data file. Thus, the hash comparator 340 may compare the second set of hashes against the initial set of hashes computed to identify block(s) whose hashes have changed. The identified block(s) are blocks that have been affected by the change in the data file. To improve the efficiency of the backup approach, only the blocks that have been affected by the change in the data file are backed up again in some embodiments. The backup appliance interface 350 may send the blocks that have been affected by the change in the data file and their current hashes to the backup appliance. Upon receipt of these blocks and their hashes, the backup appliance may generate a second version of the map of hashes usable to re-assemble these blocks with some of the blocks initially backed up to re-create the current version of the data file. The backup appliance may store these blocks and their hashes with the blocks initially backed up and their corresponding hashes.

To restore a particular version of the data file, the backup appliance interface 350 may send a restore request to the backup appliance. In response to the restore request, the backup appliance may return blocks associated with the particular version of the data file, the corresponding hashes of these blocks, and a map of hashes associated with the particular version of the data file to the backup appliance interface 350. The backup appliance interface 350 may forward the blocks, the hashes, and the map of hashes received to the file processing module 310. The file processing module 310 may re-assemble the blocks received using the map of hashes to re-create the particular version of the data file. The file processing module 210 may further use the hashes to verify the blocks. The file processing module 310 may overwrite the current version of the data file with the re-created data file. Alternatively, the file processing module 310 may save the re-created data file under another name on the computing machine without overwriting the current version of the data file, if a user requests so.

In some embodiments, the GUI module 360 of the backup agent 370 creates a GUI to display a log of multiple versions of data files on the computing system. The GUI may be integrated with a file management user interface on the computing system, such as Explorer on Windows, Finder on Macintosh, etc. The GUI may be generated automatically or may be generated in response to a user request. The log provides a convenient way for users to tell when a data file has been changed and backed up. Using such information, users may readily request restoration of a particular version of a data file of interest. In some embodiments, two user interface are generated, one for end users to manage and/or configure backup and/or restore on the backup agent 300, and another one for administrators of the backup appliance to configure policies.

Figure 4:
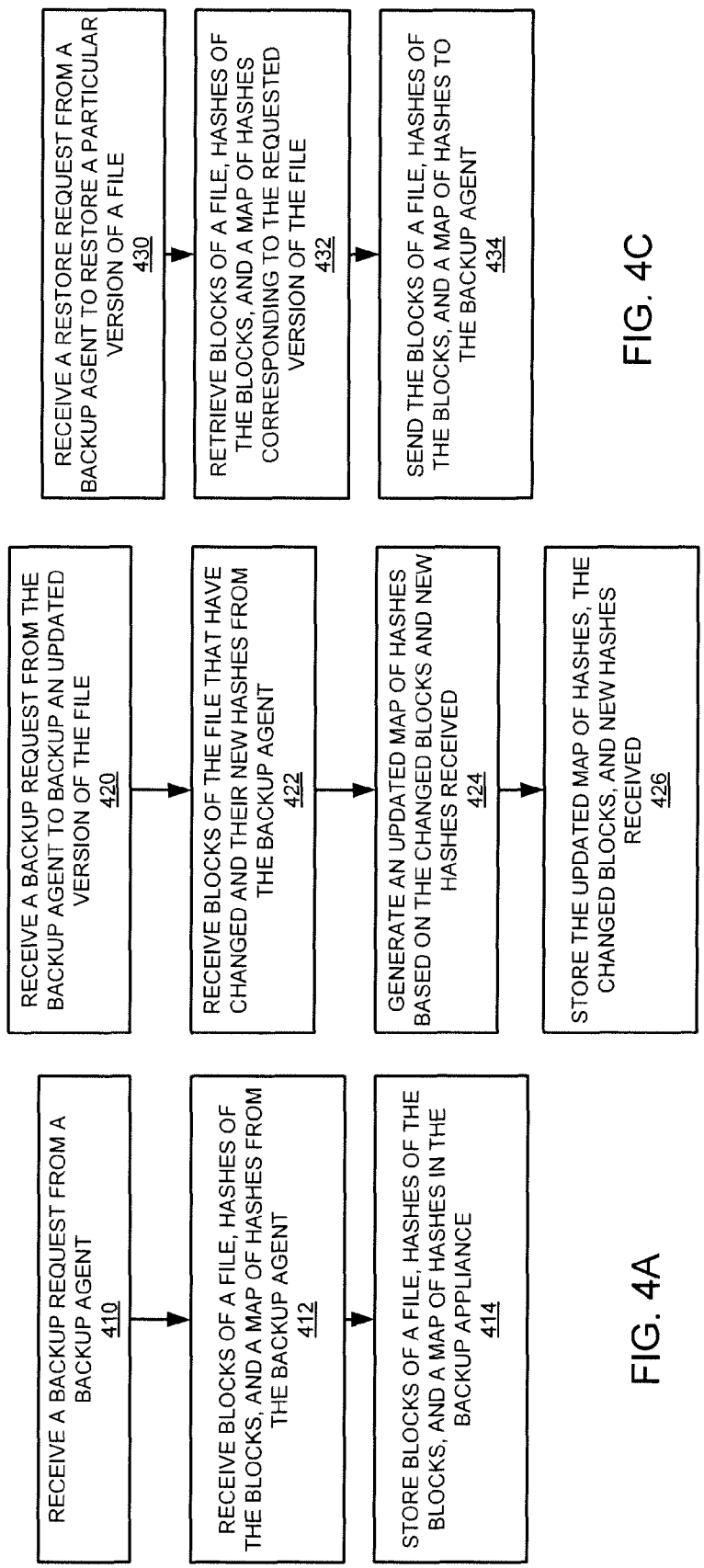
FIGS. 4A-4B illustrate one embodiment of a method to backup a file.
FIG. 4C illustrates one embodiment of a method to restore a file.

FIGS. 4A-4B illustrate one embodiment of a method to backup a file using a backup appliance, such as the backup appliance 200 illustrated in FIG. 2. The method may be performed by processing logic that may comprise hardware (e.g., circuitry, dedicated logic, programmable logic, processing cores, etc.), software (such as instructions run on a processing core), firmware, or a combination thereof.

Referring to FIG. 4A, processing logic receives a request to backup a data file from a backup agent (processing block 410). The backup agent may be running on a computing machine on which the data file is stored. Then processing logic receives blocks of the data file, hashes of the blocks, and a map of hashes from the backup agent (processing block 412). The backup agent may have broken up the data file into multiple fixed-size blocks, computed the hashes of each of the blocks, and generated the map of hashes usable to re-assemble the blocks into the data file. Processing logic stores the blocks, the hashes, and the map of hashes received in the backup appliance (processing block 414).

Referring to FIG. 4B, processing logic receives a backup request to backup an updated version of the data file from the backup agent (processing block 420). Then processing logic receives only blocks of the updated version of the data file that have changed and the updated hashes of these blocks from the backup agent (processing block 422). Then processing logic may generate an updated version of the map of hashes based on these blocks and their updated hashes (processing block 424). Finally, processing logic stores these blocks, their updated hashes, and the updated version of the map of hashes in a storage device within the backup appliance (processing block 426).

FIG. 4C illustrates one embodiment of a method to restore a file using a backup appliance, such as the backup appliance 200 illustrated in FIG. 2. The method may be performed by processing logic that may comprise hardware (e.g., circuitry, dedicated logic, programmable logic, processing cores, etc.), software (such as instructions run on a processing core), firmware, or a combination thereof.

Initially, processing logic receives a restore request from a backup agent to restore a particular version of a data file (processing block 430). The backup agent is running on a computing machine on which the particular version of the data file was previously stored. In response to the restore request, processing logic retrieves the blocks required to re-create the requested version of the data file, the corresponding hashes of these blocks, and a map of hashes associated with the requested version of the data file from a storage device in the backup appliance (processing block 432). Then processing logic sends the blocks, their hashes, and the map of hashes retrieved to the backup agent (processing block 434). The backup agent may re-assemble these blocks using the map of hashes to re-create the requested version of the data file on the computing machine. The backup agent may further use the hashes to verify the blocks.

Figure 5:
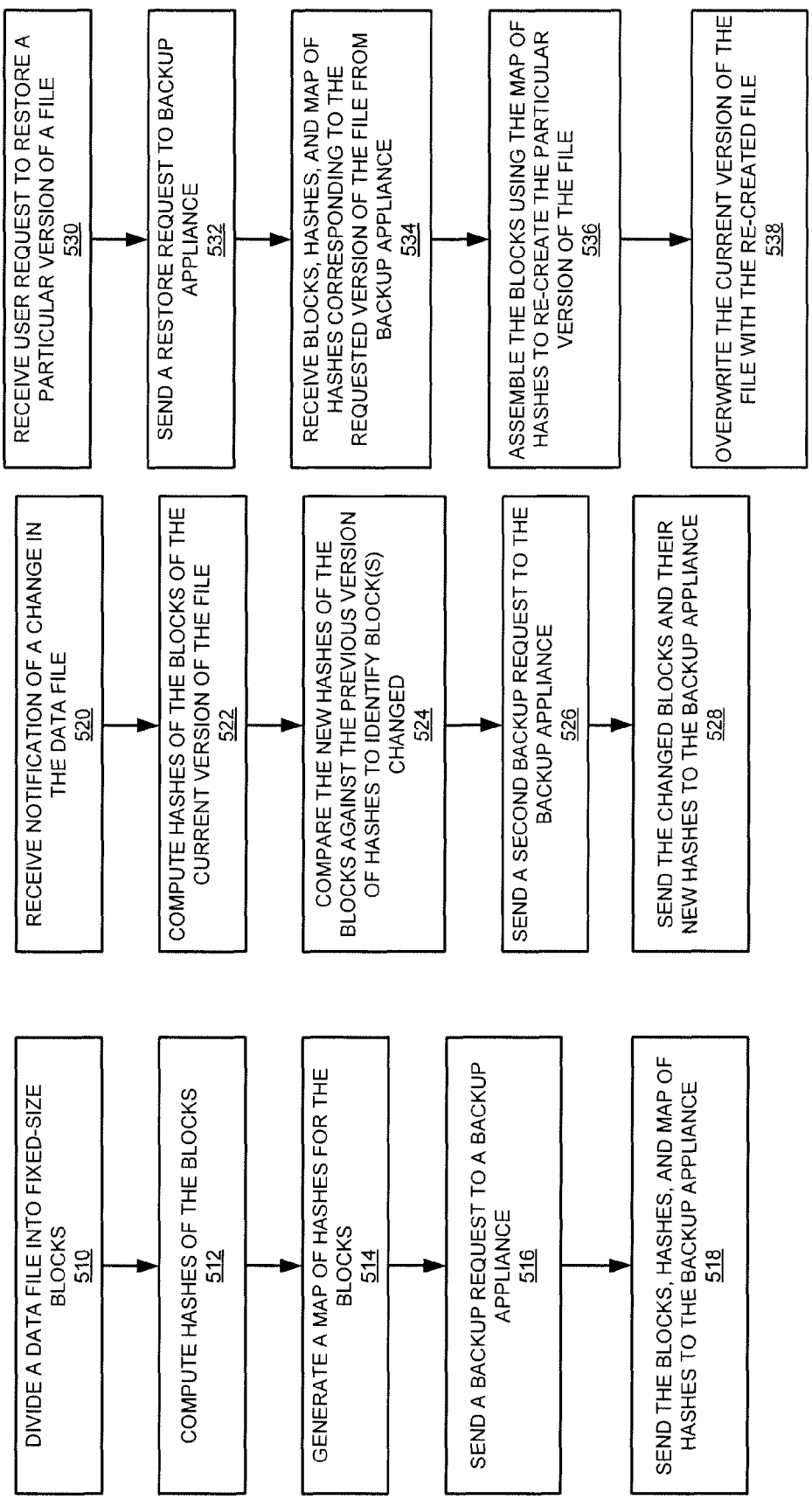
FIGS. 5A-5B illustrate one embodiment of a method to backup a file.
FIG. 5C illustrates one embodiment of a method to restore a file.

FIGS. 5A-5B illustrate one embodiment of a method to backup a data file using a backup agent running on a computing machine. The method may be performed by processing logic that may comprise hardware (e.g., circuitry, dedicated logic, programmable logic, processing cores, etc.), software (such as instructions run on a processing core), firmware, or a combination thereof.

Referring to FIG. 5A, processing logic initially divides the data file into multiple fixed-size blocks (processing block 510). Then processing logic computes hashes of the blocks (processing block 512). Processing logic may compute two or more hashes for each block in order to reduce the likelihood of hash collision. The hashes of each block may be computed using different hash algorithms, such as MD5, CRC, etc. Then processing logic may generate a map of hashes for the blocks using the hashes (processing block 514). The map of hashes is usable to re-assemble the blocks into the data file. Processing logic may send a backup request to a backup appliance, such as the backup appliance 200 illustrated in FIG. 2, communicatively coupled to the computing machine (processing block 516). Then processing logic may further send the blocks, the hashes of the blocks, and the map of hashes to the backup appliance to be stored thereon (processing block 518).

Referring to FIG. 5B, processing logic receives a notification of change in the data file from a file system running on the computing machine (processing block 520). For example, the data file may have been edited. In response to the notification, processing logic may compute hashes of the blocks of the current version of the data file (processing block 522). Then processing logic may compare the new hashes computed against the hashes of the blocks of the previous version of the data file, which are requested from the backup appliance, to identify blocks that have changed (processing block 524). Processing logic may further send a second backup request to the backup appliance to backup the current version of the data file (processing block 526). Then processing logic may send the blocks changed and the corresponding new hashes of these blocks to the backup appliance (processing block 528). The backup appliance may generate a new version of the map of hashes using the new hashes and store the blocks changed, their new hashes, and the new version of the map of hashes with the previous version of the backup data.

FIG. 5C illustrates one embodiment of a method to restore a data file using a backup agent running on a computing machine. The method may be performed by processing logic that may comprise hardware (e.g., circuitry, dedicated logic, programmable logic, processing cores, etc.), software (such as instructions run on a processing core), firmware, or a combination thereof.

In some embodiments, processing logic receives a user request to restore a particular version of a data file on the computing machine (processing block 530). In response to the user request, processing logic may send a restore request to a backup appliance communicatively coupled to the computing machine (processing block 532). Then processing logic may receive a set of blocks, hashes of the blocks, and a map of hashes corresponding to the requested version of the data file from the backup appliance (processing block 534). Using the map of hashes, processing logic may assemble the set of blocks to re-create the requested version of the data file (processing block 536). Finally, processing logic may overwrite the current version of the data file on the computing machine with the re-created data file of the requested version (processing block 538). In some embodiments, processing logic may use the hashes of the blocks, if received from the backup appliance, to verify the blocks.

Figure 6:
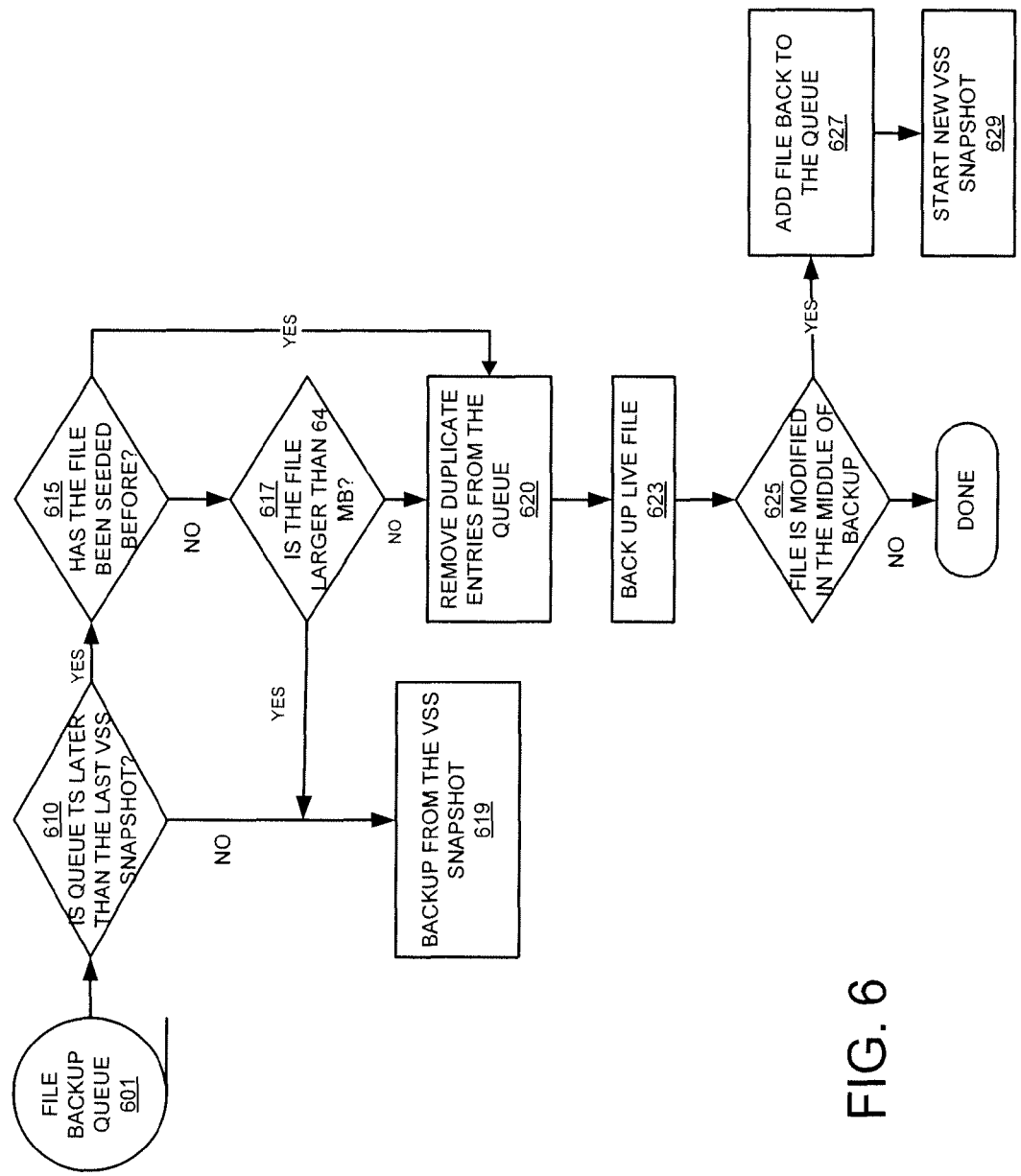
FIG. 6 illustrates one embodiment of a method to backup data with multiple backup mechanisms.

FIG. 6 illustrates one embodiment of a method to backup data using a backup agent running on a computing machine. In addition to some embodiments of block-based real time backup, the method also applies another backup mechanism, namely, VSS. However, it should be appreciated that the concept disclosed below may be applicable to other backup mechanisms as well. The method may be performed by processing logic that may comprise hardware (e.g., circuitry, dedicated logic, programmable logic, processing cores, etc.), software (such as instructions run on a processing core), firmware, or a combination thereof.

In some embodiments, processing logic maintains a file backup queue 601 on the computing machine. Processing logic first checks the queue timestamp to determine if the timestamp is later than the last VSS snapshot (processing block 610). In general, a snapshot refers to a point-in-time image of the data on the computing machine captured at a particular time. If the queue timestamp is not later than the VSS snapshot, then processing logic may backup from the VSS snapshot (processing block 619) and then the process ends. Otherwise, processing logic transitions to processing block 615.

Processing logic may determine if the data file has been seeded before (processing block 615). In other words, processing logic may determine if the data file has previously been backed up using the block-based real time backup approach, some embodiments of which have been discussed in details above. If so, processing logic transitions to processing block 620. If not, processing logic checks if the data file is larger than a predetermined size threshold, such as 64 MB (processing block 617). If the data file is larger than the predetermined size threshold, then processing logic transitions to processing block 619 to backup from the VSS snapshot. Otherwise, processing logic transitions to processing block 620.

In some embodiments, processing logic removes duplicate entries from the queue (processing block 620). Then processing logic backs up the live data file (processing block 623). Processing logic may further check if the data file has been modified in the middle of the backup (processing block 625). If not, then the backup process ends. Otherwise, if the data file has been modified in the middle of the backup, then processing logic may add the data file back to the queue (processing block 627) and start a new VSS snapshot (processing block 629).

Figure 7:
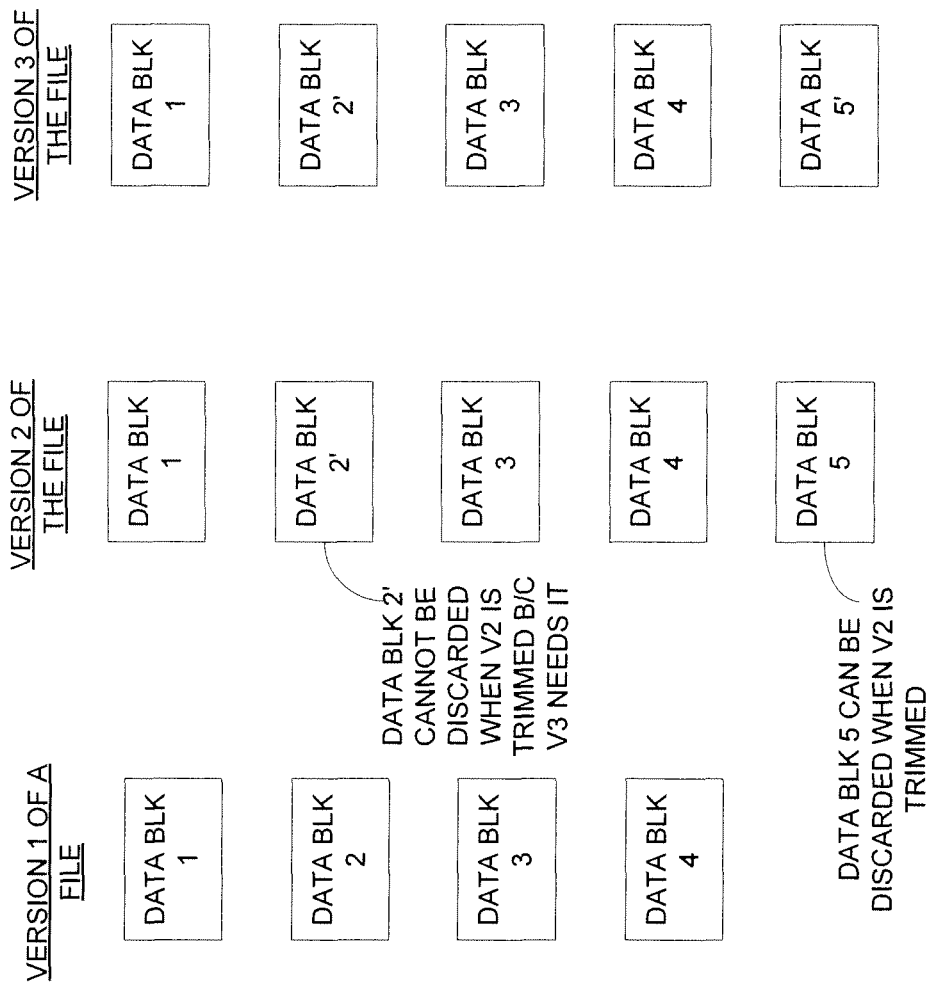
FIG. 7 illustrates one embodiment of multiple versions of a file.

FIG. 7 illustrates one embodiment of multiple versions of a file stored on a computing machine. The file includes multiple data blocks, where both the file and the data blocks can be tracked and backed up in multiple versions as discussed below.

Referring to FIG. 7, three (3) versions of the same file are illustrated, which are referred to as versions 1, 2, and 3. In version 1 of the file, there are four data blocks, namely, data block 1, data block 2, data block 3, and data block 4. In version 2 of the file, there are five data blocks, namely, data block 1, data block 2', data block 3, data block 4, and data block 5. Note that data block 2 has changed into data block 2' and data block 5 is a new data block added to version 2 of the file. In version 3 of the file, there are five data blocks, namely, data block 1, data block 2', data block 3, data block 4, and data block 5'. Note that data block 5 has changed into data block 5' from version 2 to version 3 of the file. To ensure consistency of the file, the correct versions of the data blocks are tracked with each version of the file. In some embodiments, a backup agent running on the computing system may generate a map of file for each version of the file. The map of file tells which versions of data blocks to use in re-building the particular version of the file. The backup agent may send the map of file as part of the backup data of the file to a backup appliance coupled to the computing machine during the backup of the file.

In some embodiments, block-based real time backup supports version trimming. That is, one or more versions of the file may be trimmed or removed from the backup data of the file. However, even when a particular version is trimmed, consistency of the backup data of the file still needs to be maintained. To maintain consistency, the backup appliance may go through each version of the map of file to determine which versions of which data blocks are not needed in re-building the remaining versions of the file. For instance, referring back to FIG. 7, suppose version 2 of the file is to be trimmed. Before discarding any version of the data block in version 2 of the data, the backup appliance may check the maps of file of version 1 and version 3 of the file. In the current example, the backup appliance may determine that data block 2' has to be preserved in order to re-build version 3 of the file, but data block 5 is not needed to re-build either version 1 or version 3 of the file. Therefore, the backup appliance may remove or discard data block 5 in the process of trimming version 2 of the file, while retaining data block 2'.

In some embodiments, the block-based real time backup approach discussed herein is applicable to file sets as well. A file set generally refers to a set of files, each having multiple versions. In order to maintain data consistency, various versions of the files in a file set has to be kept in sync. The concept of backing up file sets is useful in some application backup, such as backing up a database, which may include data files, logs, etc. These files form a file set, and thus, these files have to be backed up together, trimmed together, and restored together. In some embodiments, a map of file set may be generated to track various versions of the files in the file set, and is usable to determine which version(s) of which file(s) to remove in the event of trimming a particular version of the file set in order to preserve consistency of the remaining versions of the file set.

Figure 8:
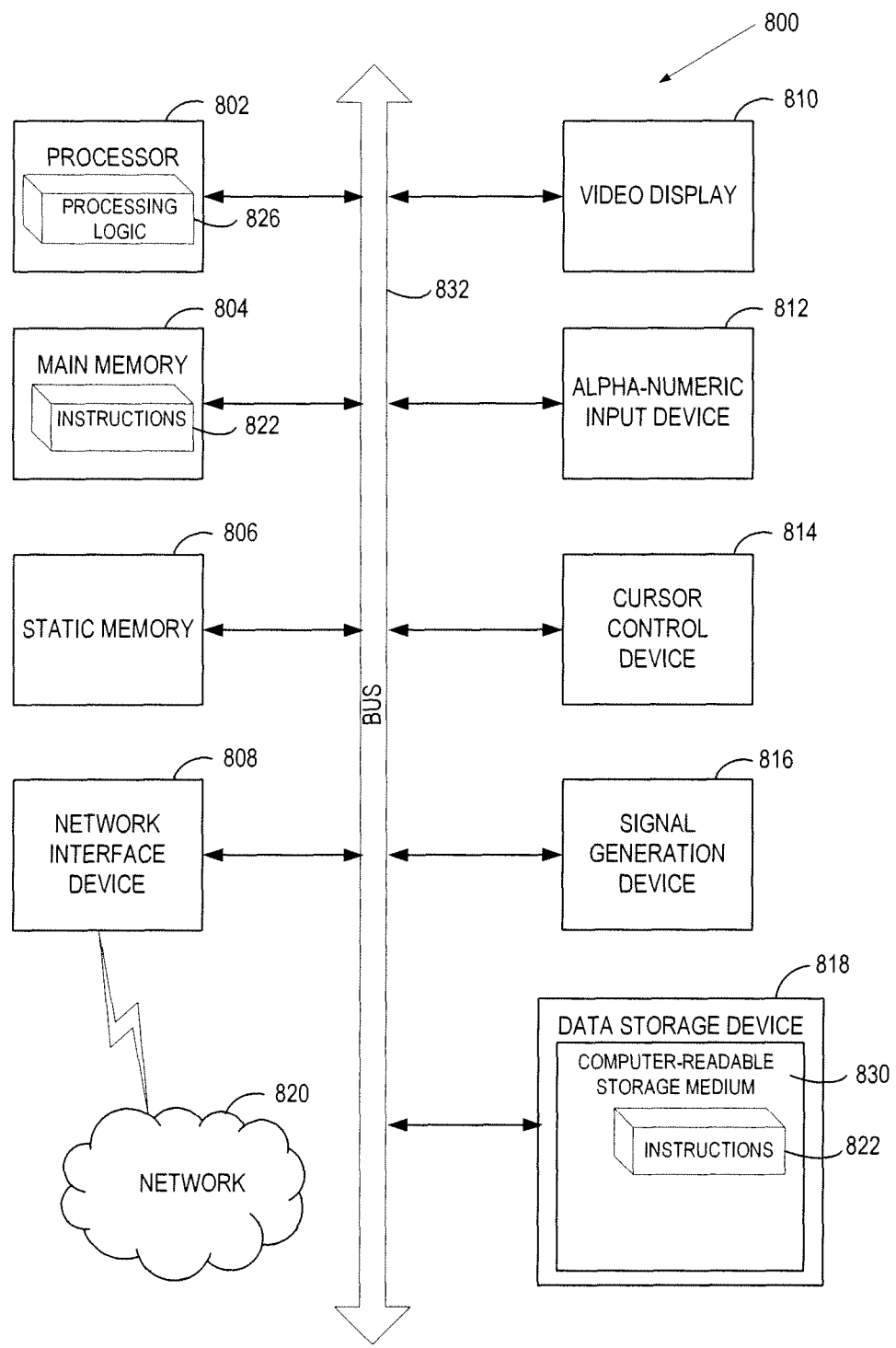
FIG. 8 illustrates a block diagram of an exemplary computer system, in accordance with one embodiment of the present invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 832.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 830 (also known as a machine-readable storage medium or a computer-readable medium) on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting machine-accessible storage media. The software 822 may further be transmitted or received over a network 820 via the network interface device 808.

While the machine-accessible storage medium 830 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc. In some embodiments, machine-accessible storage medium may also be referred to as computer-readable storage medium.

Thus, some embodiments of continuous data backup using real time delta storage have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
receiving, by a backup appliance, a backup request from a backup agent running on a computing machine to back up data on the computing machine, the computing machine being coupled to the backup appliance;
the backup appliance performing block-based real-time backup of the data on the computing machine while the computing machine is still operating and without interrupting computing machine operation, wherein the backup data includes a file having a plurality of fixed-size blocks, a plurality of hashes of the plurality of fixed-size blocks, a map of hashes usable to reassemble the plurality of fixed-sized blocks into the file, and for at least one of the plurality of fixed-sized blocks there is at least two hashes; and
the backup appliance storing backup data of the computing machine in a computer-readable storage device in the backup appliance, the backup appliance storing multiple versions of a map of file sets usable to build different versions of the plurality of files, which are used to rebuild different versions of the file set.

2. The method of claim 1, further comprising:
the backup appliance receiving from the backup agent running on the computing machine the plurality of fixed-size blocks, the plurality of hashes of the plurality of fixed-size blocks, and a map of hashes usable to reassemble the plurality of blocks into the file.

3. The method of claim 2, wherein the backup data comprises the plurality of fixed-size blocks, the plurality of hashes of the plurality of fixed-size blocks, one or more versions of each of the plurality of fixed-size blocks, one or more hashes of the one or more versions of each of the plurality of fixed-size blocks, and one or more versions of the map of hashes.

4. The method of claim 1, wherein the backup appliance is further coupled to a second computing machine to backup data on the second computing machine, and the method further comprises:
the backup appliance preventing a second backup agent running on the second computing machine from accessing the backup data of the first computing machine; and
the backup appliance preventing the backup agent running on the computing machine from accessing backup data of the second computing machine stored in the backup appliance.

5. The method of claim 4, wherein said preventing comprises:
the backup appliance encrypting the backup data of the computing machine and the backup data of the second computing machine.

6. The method of claim 1, further comprising:
the backup appliance compressing the backup data of the computing machine before storing the backup data.

7. The method of claim 1, further comprising:
in response to a request from the backup agent to trim a particular version of the file set, the backup appliance using the map of file sets to determine which version of which of the plurality of files to remove without destroying consistency of remaining versions of the file set.

8. A computer-implemented method comprising:
sending, by a backup agent running on a processing device in a first computing machine, a backup request to a backup appliance coupled to the first computing machine to back up a file on the first computing machine;
the backup agent dividing the file into a plurality of fixed-size blocks without interrupting computing machine operation;
the backup agent computing a plurality of hashes of the plurality of fixed-size blocks without interrupting computing machine operation, wherein for at least one of the plurality of fixed-sized blocks there is at least two hashes;
the backup agent creating a map of hashes usable to reassemble the plurality of blocks into the file while the computing machine is operating and without interrupting computing machine operation; and
the backup agent sending the plurality of blocks, the plurality of hashes, and the map of hashes to the backup appliance to be stored in the backup appliance, the backup appliance storing multiple versions of a map of file sets usable to build different versions of the plurality of files, which are used to rebuild different versions of the file set.

9. The method of claim 8, wherein the backup agent computing the plurality of hashes of the plurality of fixed-size blocks comprises:

the backup agent computing at least two hashes for each of the plurality of fixed-size blocks using at least two distinct hash algorithms.

10. The method of claim 8, further comprising:
the backup agent receiving from a file system running on the first computing machine notification of a change in the file;
the backup agent computing a second plurality of hashes of the plurality of fixed-size blocks;
the backup agent comparing the second plurality of hashes against the plurality of hashes to identify one or more of the plurality of fixed-size blocks that have changed; and
the backup agent backing up only the one or more blocks of the plurality of fixed-size blocks that have changed.

11. The method of claim 10, wherein the backup agent backing up only the one or more blocks of the plurality of fixed-size blocks that have changed comprises:
the backup agent sending to the backup appliance the one or more blocks of the plurality of fixed-size blocks that have changed, one or more hashes of the second plurality of hashes computed for the one or more blocks of the plurality of fixed-size blocks that have changed.

12. The method of claim 8, further comprising:
in response to a user request, the backup agent sending a restore request to the backup appliance to restore a particular version of the file;
the backup agent receiving a second plurality of blocks, a second plurality of hashes associated with the second plurality of blocks, and a second map of hashes associated with the particular version of the file from the backup appliance; and
the backup agent reassembling the second plurality of blocks based on the second map of hashes to re-create the particular version of the file.

13. The method of claim 8, further comprising:
the backup agent creating a graphical user interface (GUI) to display a log of different versions of the file.

14. A backup appliance comprising:
a network interface to receive a backup request from a backup agent running on a computing machine to back up data on the computing machine, the computing machine being coupled to the backup appliance;
a processing device to perform block-based real-time backup of the data on the computing machine while the computing machine is operating and without interrupting computing machine operation, wherein the backup data includes a file having a plurality of fixedsize blocks, a plurality of hashes of the plurality of fixed-size blocks, a map of hashes usable to reassemble the plurality of fixed-sized blocks into the file, and for at least one of the plurality of fixed-sized blocks there is at least two hashes; and
a data storage device to store backup data of the computing machine, the backup appliance storing multiple versions of a map of file sets usable to build different versions of the plurality of files, which are used to rebuild different versions of the file set.

15. The backup appliance of claim 14, wherein the network interface further receives from the backup agent running on the computing machine the plurality of fixed-size blocks, the plurality of hashes of the plurality of fixed-size blocks, and a map of hashes usable to reassemble the plurality of blocks into the file.

16. The backup appliance of claim 15, wherein the backup data comprises the plurality of fixed-size blocks, the plurality of hashes of the plurality of fixed-size blocks, one or more versions of each of the plurality of fixed-size blocks, one or more hashes of the one or more versions of each of the plurality of fixed-size blocks, and one or more versions of the map of hashes.

17. The backup appliance of claim 14, wherein the network interface is further coupled to a second computing machine and the processing device further backs up data on the second computing machine, and the method further comprises:
the backup appliance preventing a second backup agent running on the second computing machine from accessing the backup data of the first computing machine; and
the backup appliance preventing the backup agent running on the computing machine from accessing backup data of the second computing machine stored in the backup appliance.

18. The backup appliance of claim 17, wherein the processing device further encrypts the backup data of the computing machine and the backup data of the second computing machine.

19. The backup appliance of claim 14, wherein the processing device further compresses the backup data of the computing machine before storing the backup data.

20. The backup appliance of claim 14, wherein the data on the computing machine comprises a file set having a plurality of files, and the data storage device further stores multiple versions of a map of file sets usable to build different versions of the plurality of files, which are used to rebuild different versions of the file set.

21. The backup appliance of claim 20, wherein the network interface receives a request from the backup agent to trim a particular version of the file set, and in response, the processing device further uses the map of file sets to determine which version of which of the plurality of files to remove without destroying consistency of remaining versions of the file set.

22. A backup agent comprising:
a backup appliance interface that includes a network interface, wherein the backup appliance interface is configured to send a backup request using the network interface to a backup appliance coupled to the first computing machine to back up a file on the first computing machine;
a file processing module, executable on the processing device, to divide the file into a plurality of fixed-size blocks without interrupting first computing machine operation;
a hash computing module, executable on the processing device, to compute a plurality of hashes of the plurality of fixed-size blocks while the computing machine is operating and without interrupting first computing machine operation, wherein for at least one of the plurality of fixed-sized blocks there is at least two hashes; and
a map of hashes generator, executable on the processing device, to create a map of hashes usable to reassemble the plurality of blocks into the file without interrupting first computing machine operation, wherein the backup appliance interface is further operable to send the plurality of blocks, the plurality of hashes, and the map of hashes to the backup appliance to be stored in the backup appliance, the backup appliance storing multiple versions of a map of file sets usable to build different versions of the plurality of files, which are used to rebuild different versions of the file set.

23. The backup agent of claim 22, wherein the hash computing module computes at least two hashes for each of the plurality of fixed-size blocks using at least two distinct hash algorithms.

24. The backup agent of claim 22, wherein the file processing module receives from a file system running on the first computing machine notification of a change in the file, and in response, the hash computing module computes a second plurality of hashes of the plurality of fixed-size blocks, wherein the backup agent further comprises:
    a hash comparator to compare the second plurality of hashes against the plurality of hashes to identify one or more of the plurality of fixed-size blocks that have changed, wherein only the one or more blocks of the plurality of fixed-size blocks that have changed are backed up again.

25. The backup agent of claim 24, wherein the backup appliance interface sends to the backup appliance the one or more blocks of the plurality of fixed-size blocks that have changed, one or more hashes of the second plurality of hashes computed for the one or more blocks of the plurality of fixed-size blocks that have changed.

26. The backup agent of claim 22, wherein the backup appliance interface sends a restore request to the backup appliance to restore a particular version of the file in response to a user request, and then the backup appliance interface receives a second plurality of blocks, a second plurality of hashes associated with the second plurality of blocks, and a second map of hashes associated with the particular version of the file from the backup appliance, and the file processing module reassembling the second plurality of blocks based on the second map of hashes to re-create the particular version of the file.

27. The backup agent of claim 22, further comprising:
    a graphical user interface (GUI) module, executable on the processing device, to create a GUI to display a log of different versions of the file.

28. A non-transitory computer-readable storage medium that provides instructions that, when executed by a processor, will cause the processor to perform a method comprising:
    receiving, by a backup appliance, a backup request from a backup agent running on a computing machine to back up data on the computing machine, the computing machine being coupled to the backup appliance;
    the backup appliance performing block-based real-time backup of the data on the computing machine while the computing machine is operating and without interrupting computing machine operation, wherein the backup data includes a file having a plurality of fixedsize blocks, a plurality of hashes of the plurality of fixed-size blocks, a map of hashes usable to reassemble the plurality of fixed-sized blocks into the file, and for at least one of the plurality of fixed-sized blocks there is at least two hashes; and
    the backup appliance storing backup data of the computing machine in a computer-readable storage device in the backup appliance, the backup appliance storing multiple versions of a map of file sets usable to build different versions of the plurality of files, which are used to rebuild different versions of the file set.

29. The non-transitory computer-readable storage medium of claim 28, wherein the method further comprises:
    the backup appliance receiving from the backup agent running on the computing machine the plurality of fixed-size blocks, the plurality of hashes of the plurality of fixed-size blocks, and a map of hashes usable to reassemble the plurality of blocks into the file.

30. The non-transitory computer-readable storage medium of claim 29, wherein the backup data comprises the plurality of fixed-size blocks, the plurality of hashes of the plurality of fixed-size blocks, one or more versions of each of the plurality of fixed-size blocks, one or more hashes of the one or more versions of each of the plurality of fixed-size blocks, and one or more versions of the map of hashes.

31. The non-transitory computer-readable storage medium of claim 28, wherein the backup appliance is further coupled to a second computing machine to backup data on the second computing machine, and the method further comprises:
    the backup appliance preventing a second backup agent running on the second computing machine from accessing the backup data of the first computing machine; and
    the backup appliance preventing the backup agent running on the computing machine from accessing backup data of the second computing machine stored in the backup appliance.

32. The non-transitory computer-readable storage medium of claim 31, wherein said preventing comprises:
    the backup appliance encrypting the backup data of the computing machine and the backup data of the second computing machine.

33. The non-transitory computer-readable storage medium of claim 28, wherein the method further comprises:
    the backup appliance compressing the backup data of the computing machine before storing the backup data.

34. The non-transitory computer-readable storage medium of claim 28, wherein the method further comprises:
    in response to a request from the backup agent to trim a particular version of the file set, the backup appliance using the map of file sets to determine which version of which of the plurality of files to remove without destroying consistency of remaining versions of the file set.

35. A non-transitory computer-readable storage medium that provides instructions that, when executed by a processor, will cause the processor to perform a method comprising:
    sending, by a backup agent running on a processing device in a first computing machine, a backup request to a backup appliance coupled to the first computing machine to back up a file on the first computing machine;
    the backup agent dividing the file into a plurality of fixed-size blocks without interrupting first computing machine operation;
    the backup agent computing a plurality of hashes of the plurality of fixed-size blocks without interrupting first computing machine operation;
    the backup agent creating a map of hashes usable to reassemble the plurality of blocks into the file while the computing machine is operating and without interrupting first computing machine operation, wherein for at least one of the plurality of fixed-sized blocks there is at least two hashes; and
    sending the plurality of blocks, the plurality of hashes, and the map of hashes to the backup appliance to be stored in the backup appliance, the backup appliance storing multiple versions of a map of file sets usable to build different versions of the plurality of files, which are used to rebuild different versions of the file set.

36. The non-transitory computer-readable storage medium of claim 35, wherein the backup agent computing the plurality of hashes of the plurality of fixed-size blocks comprises:
    the backup agent computing at least two hashes for each of the plurality of fixedsize blocks using at least two distinct hash algorithms.

37. The non-transitory computer-readable storage medium of claim 35, wherein the method further comprises:
    the backup agent receiving from a file system running on the first computing machine notification of a change in the file;
    the backup agent computing a second plurality of hashes of the plurality of fixedsize blocks;

the backup agent comparing the second plurality of hashes against the plurality of hashes to identify one or more of the plurality of fixed-size blocks that have changed; and the backup agent backing up only the one or more blocks of the plurality of fixedsize blocks that have changed.

38. The non-transitory computer-readable storage medium of claim 37, wherein the backup agent backing up only the one or more blocks of the plurality of fixed-size blocks that have changed comprises:

the backup agent sending to the backup appliance the one or more blocks of the plurality of fixed-size blocks that have changed, one or more hashes of the second plurality of hashes computed for the one or more blocks of the plurality of fixed-size blocks that have changed.

39. The non-transitory computer-readable storage medium of claim 35, wherein the method further comprises:

in response to a user request, the backup agent sending a restore request to the backup appliance to restore a particular version of the file;

the backup agent receiving a second plurality of blocks, a second plurality of hashes associated with the second plurality of blocks, and a second map of hashes associated with the particular version of the file from the backup appliance; and the backup agent reassembling the second plurality of blocks based on the second map of hashes to re-create the particular version of the file.

40. The non-transitory computer-readable storage medium of claim 35, wherein the method further comprises:

the backup agent creating a graphical user interface (GUI) to display a log of different versions of the file.

\* \* \* \* \*